(No Model.)  5 Sheets—Sheet 2.

G. A. FRANKE.
VALVE GEAR.

No. 418,404. Patented Dec. 31, 1889.

Witnesses:
C. Sedgwick
J. M. Ritter

Inventor:
G. A. Franke
By Munn & Co.
Attorneys (No Model.)　　　　　　　　　　　　　　　　5 Sheets—Sheet 3.
G. A. FRANKE.
VALVE GEAR.

No. 418,404.　　　　　　　　　Patented Dec. 31, 1889.

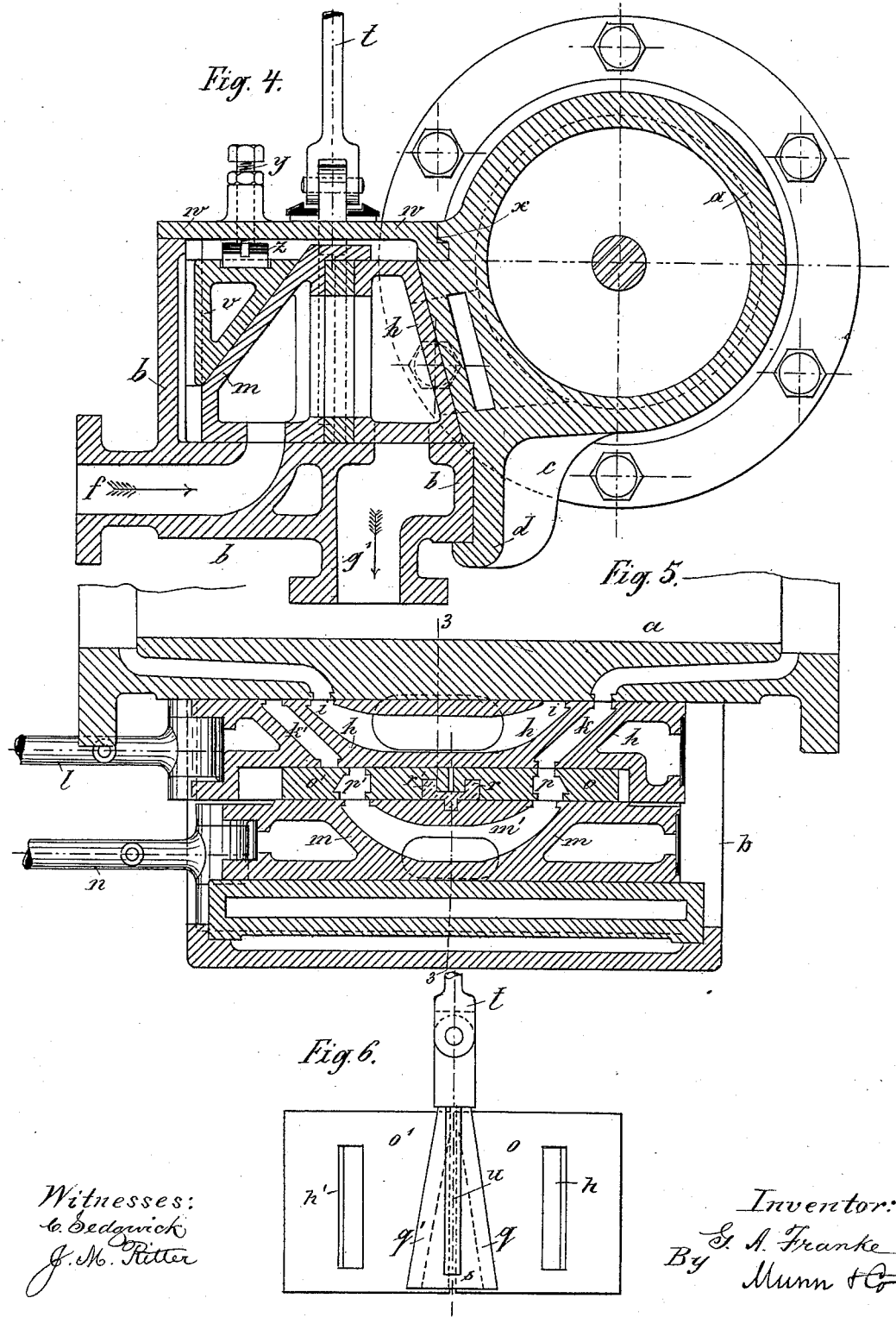

(No Model.)  5 Sheets—Sheet 5.

G. A. FRANKE.
VALVE GEAR.

No. 418,404.  Patented Dec. 31, 1889.

Witnesses:
C. Sedgwick
J. M. Ritter

Inventor:
G. A. Franke
By Munn & Co.
Attorneys

UNITED STATES PATENT OFFICE.

GEORG ANDREAS FRANKE, OF MÜHLHAUSEN, PRUSSIA, GERMANY.

VALVE-GEAR.

SPECIFICATION forming part of Letters Patent No. 418,404, dated December 31, 1889.

Application filed March 5, 1889. Serial No. 301,837. (No model.)

*To all whom it may concern:*

Be it known that I, GEORG ANDREAS FRANKE, a subject of the King of Prussia, residing at Mühlhausen, Thuringia, in the Kingdom of Prussia, Germany, have invented new and useful Improvements in Valve-Gears for Steam-Engines, of which the following is a specification.

The present invention relates to a valve-gear for steam-engines, steam-pumps, steam-hammers, &c., in which there is no steam-pressure upon the back of the slide-valves, so that they may be considered to be balanced and the lubricant may be supplied direct to the slide-valve face. An important advantage is that the steam-tight valve-chest covers, stuffing-boxes, glands, and valve-rods, which are necessary in ordinary valve-gears, may be dispensed with. Another advantage is in the simplification of the expansion or cut-off slide-valve by the use of two cut-off plates adjusted by a wedge controlled by the governor. This valve-gear may be operated in the usual manner by means of eccentrics; but elliptical gear may be employed to move the slide-valves quickly at the points of admission and cut-off.

Figure 1:
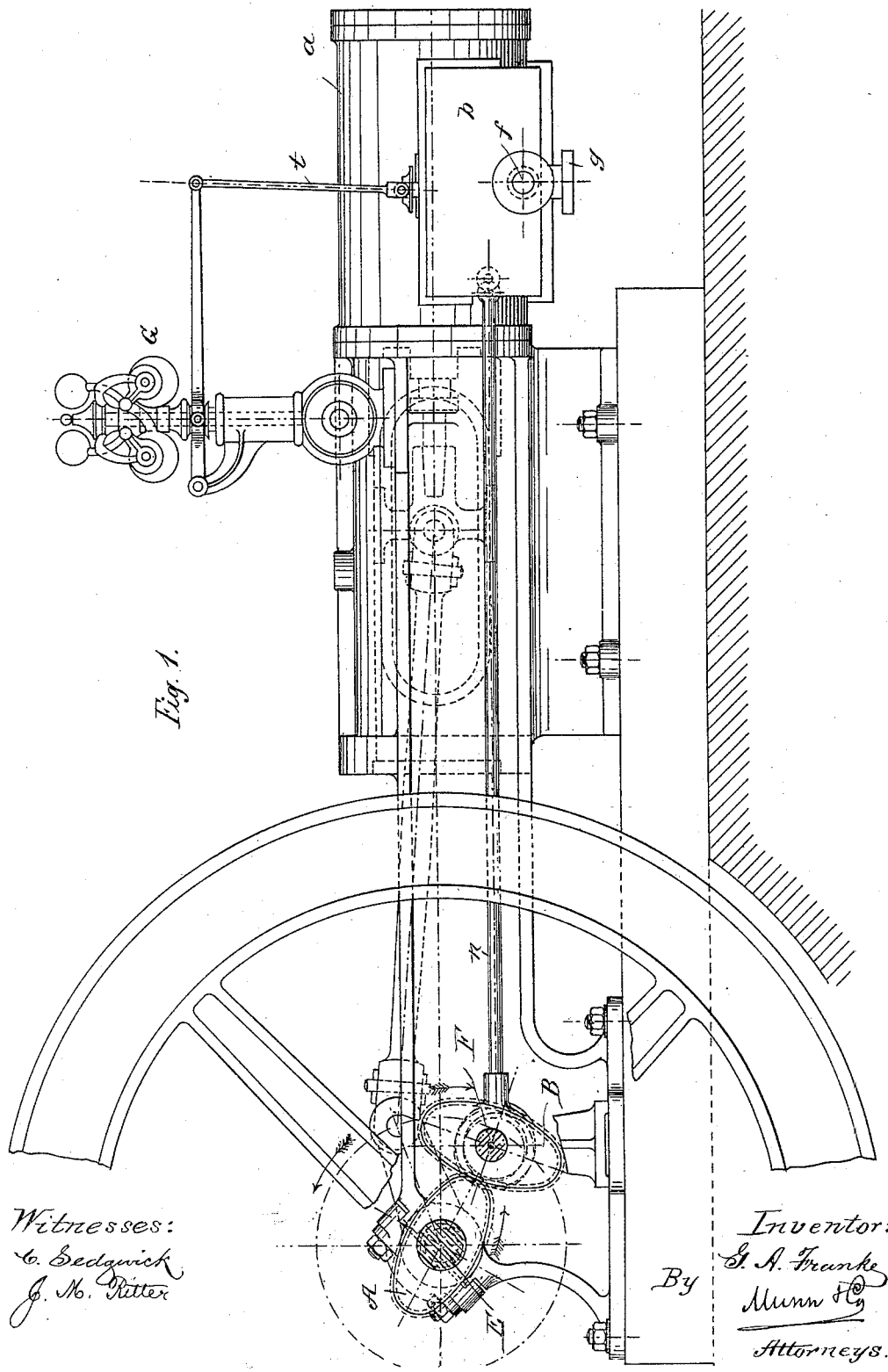
Figure 2:
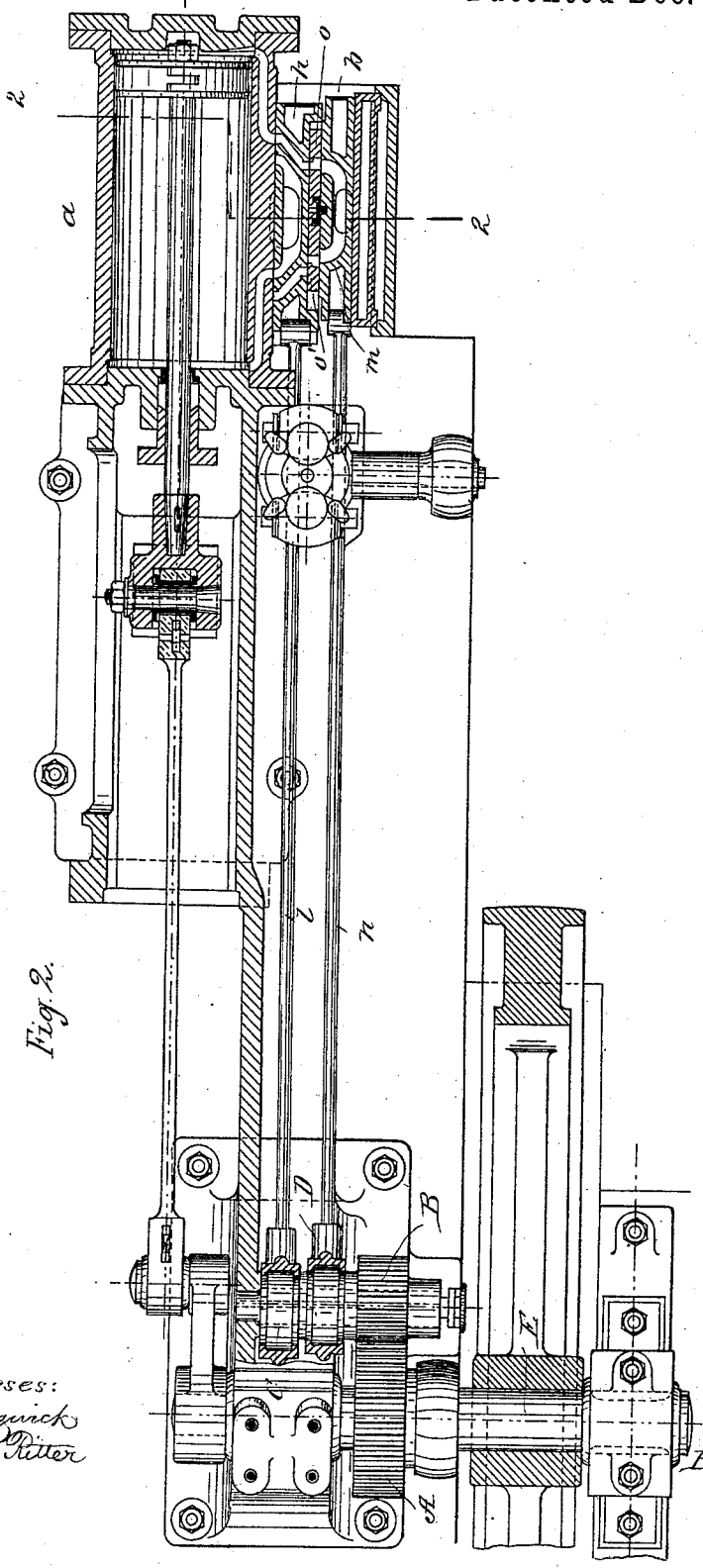
Figure 3:
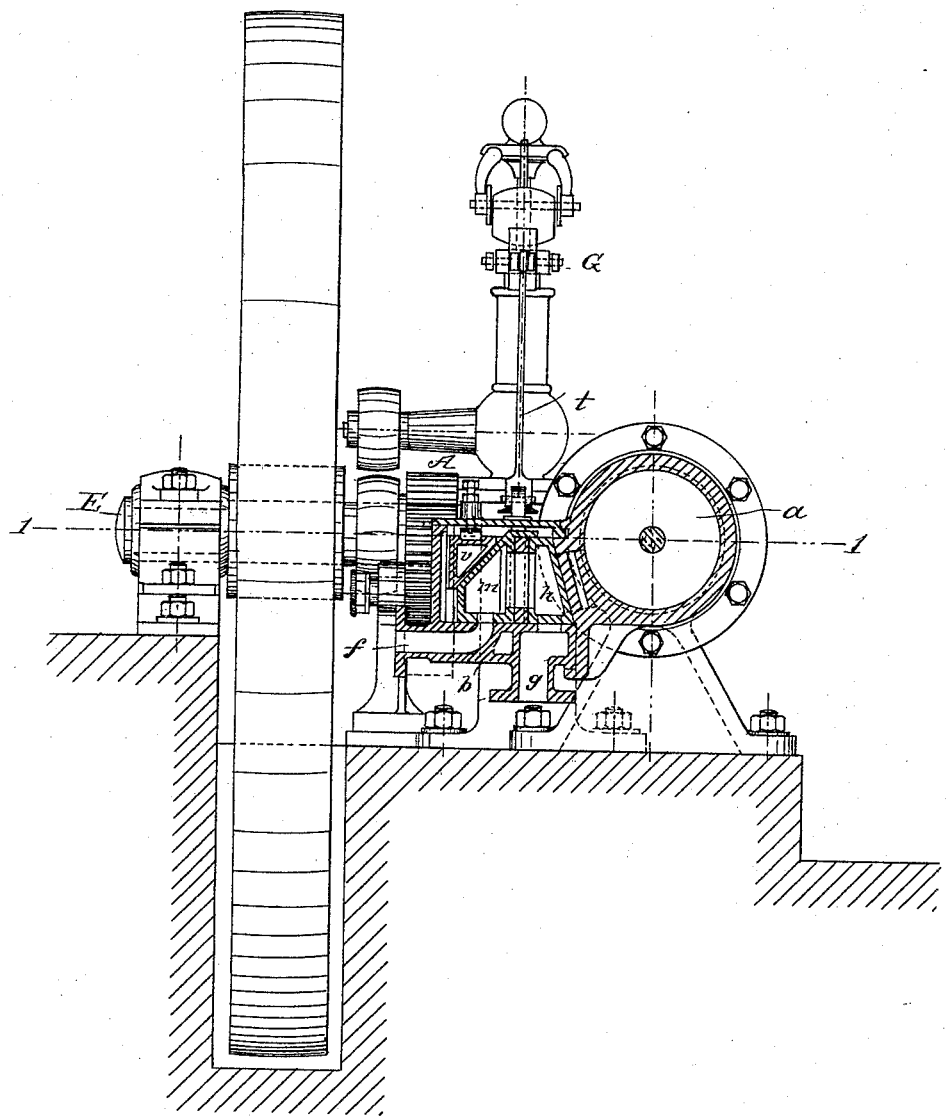
Figure 7:
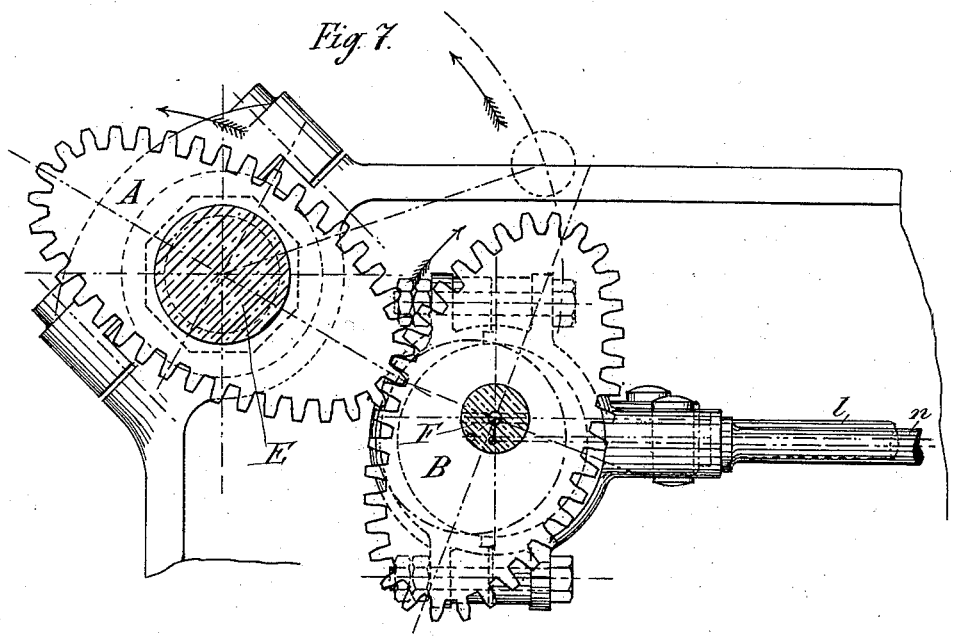
Figure 8:
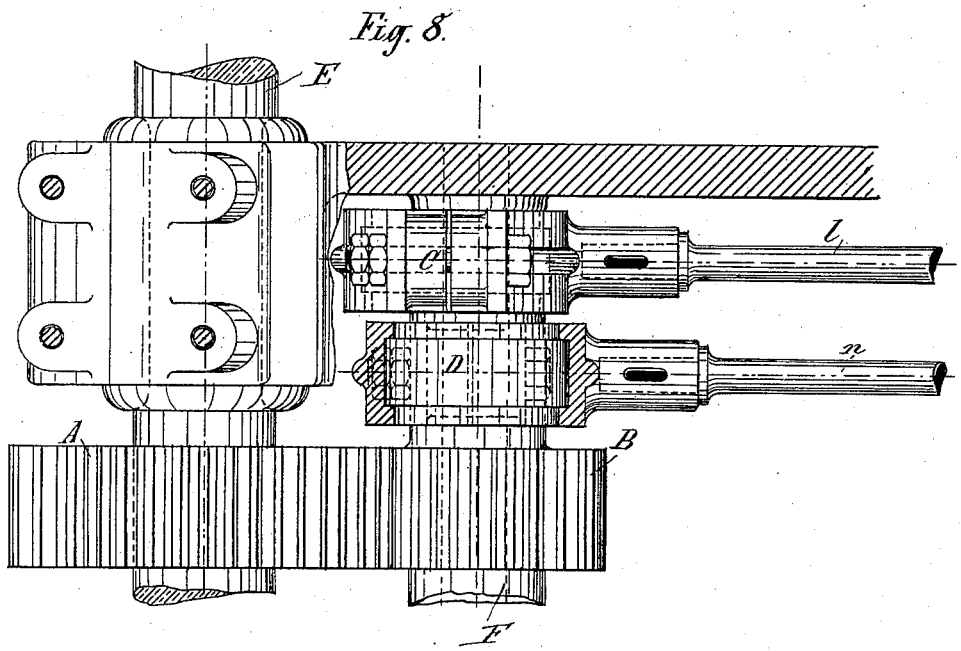

In the annexed drawings, illustrating the valve-gear, Figure 1 is a side elevation of a horizontal steam-engine provided with the improved valve-gear, and Fig. 2 is a plan of the same in section on the line 1 1 of Fig. 3. Fig. 3 is cross-section on the line 2 2 of Fig. 2 through the cylinder and the slide-valves. Fig. 4 is an enlarged cross-section on the line 3 3 of Fig. 5. Fig. 5 is a longitudinal section on the line 4 4 of Fig. 4. Fig. 6 is a rear face view of the two cut-off plates and their operating-wedge controlled by the governor. Fig. 7 is an enlarged face view, and Fig. 8 is a plan of the elliptical gear for operating the valve-connecting rods.

The main slide-valve $h$ and the variable expansion-valve $m$, with the adjustable cut-off plates $o$ $o'$, are contained in an open-ended chest $b$, connected at $d$ to a face stiffened by ribs $c$ at the under side of the cylinder $a$. (See Fig. 4.) The bottom of the steam-chest contains the steam-inlet passages F and the exhaust-passages $g$, opening at the under side of the expansion and main valves $m$ and $h$, respectively, as shown, this downward direction of the exhaust favoring the carrying away of water of condensation.

$h$ is the main slide-valve, of the form shown in Figs. 4 and 5, and having ports $i$, leading to the exhaust-passage opening at the under side of the valve, and the two live-steam passages $k$ $k'$, leading through the valve. This valve is coupled directly to the eccentric-rod $l$.

$m$ is the expansion-valve, of the form shown in Figs. 4 and 5, having a passage $m'$, opening at the under side of the valve and leading to ports in the adjustable cut-off plates $o$ $o'$. It is coupled directly to the eccentric-rod $n$. Between the main and expansion valves are the two cut-off plates $o$ and $o'$, provided with through-ports $p$ $p'$. These two cut-off plates work in a recess at the back of the main valve $h$ and constitute an adjustable working-face of the expansion-valve $m$, to which they are connected, as hereinafter described. In the back of each plate is a groove, the two grooves $q$ $q'$, Fig. 6, being inclined in opposite directions at an acute angle to the vertical, in which engage guide-ribs $r$ and $r'$ on a wedge $s$, which is moved up and down by the governor G through the medium of a connecting-rod $t$. This wedge $s$ has a third guide-rib $u$, received in a vertical or transverse slot in the cut-off valve. By the raising or lowering of the wedge the cut-off plates $o$ and $o'$ are adjusted closer together or farther apart, whereby the steam is cut off sooner or later to the main valve $h$ by the direct influence of the governor and a variable rate of expansion in the engine-cylinder is obtained.

In order to hold the two valves up to their seats, a packing-wedge $v$, Fig. 4, is applied to the inclined back of the expansion-valve and abuts against the rear side of the steam-chest. It is forced downward by pressure-screws $y$, acting through spring $z$, whereby to maintain an elastic pressure and hold the two valves tight against their respective seats, both in the direction of the ports leading to the cylinder and those in the bottom of the valve-chest. The valve-chest is covered by a cover $w$, which fits in a groove $x$ in the cylinder $a$ and is fixed to the rear wall of the valve-chest $b$. All the rubbing-surfaces of the main and cut-off valves are provided on their upper surfaces with lubricating-grooves, from which extend lateral grooves to the valve-faces in order to keep the surface well oiled.

The valve-connecting-rods $l$ and $n$ may be operated in the usual manner or by means of the elliptical wheels A and B, the former being keyed on the crank-shaft E, while the latter is on a separate shaft F, on which also are keyed the eccentrics C D, which are connected by the valve-rods $l$ $n$ with the main and expansion valves $h$ and $m$, respectively. The employment of the elliptical wheels in combination with the eccentrics effects a quick admission and cut-off.

Having now fully described the nature of my said invention and in what manner the same is to be performed, I declare that what I claim is—

1. In a valve-gear, the combination, with a main valve provided with inlet-ports adapted to regulate with the cylinder-ports, of cut-off plates having ports operating on the inlet-ports of the said main valve, a governor for controlling the said cut-off plates to cut the steam off sooner or later to the main valve, and an expansion-valve provided with a steam-inlet passage adapted to register with the ports in the said cut-off plates, substantially as shown and described.

2. In a valve-gear, the combination, with main valve provided with inlet-ports and an exhaust-port operating over the cylinder-ports, of cut-off plates provided with ports adapted to register with the inlet-ports of the said main valve, the said cut-off plates being controlled by the governor, and an expansion-valve provided with a steam-inlet passage adapted to register with the ports in the said cut-off plates, substantially as shown and described.

3. In a valve-gear, the combination, with main valve provided with inlet-ports and an exhaust-port operating over the cylinder-ports, of cut-off plates provided with ports adapted to register with the inlet-ports of the said main valve, the said cut-off plates being controlled by the governor, an expansion-valve provided with a steam-inlet passage adapted to register with the ports in the said cut-off plates, and two eccentrics driven from the crank-shaft and controlling the said main valve and the expansion-valve, substantially as shown and described.

4. In a valve-gear, the combination, with a main valve provided with inlet-ports adapted to regulate with the cylinder-ports, of cut-off plates having ports operating on the inlet-ports of the said main valve, a governor for controlling the said cut-off plates to cut the steam off sooner or later to the main valve, and two eccentrics controlling the said main valve and the said expansion-valve, and elliptical wheels driven from the crank-shaft and operating the said eccentrics, substantially as shown and described.

In testimony whereof I have signed my name to this specification in the presence of two subscribing witnesses.

GEORG ANDREAS FRANKE.

Witnesses:
 OTTO BLENKE,
 W. EGGELING.